Patented Nov. 13, 1951

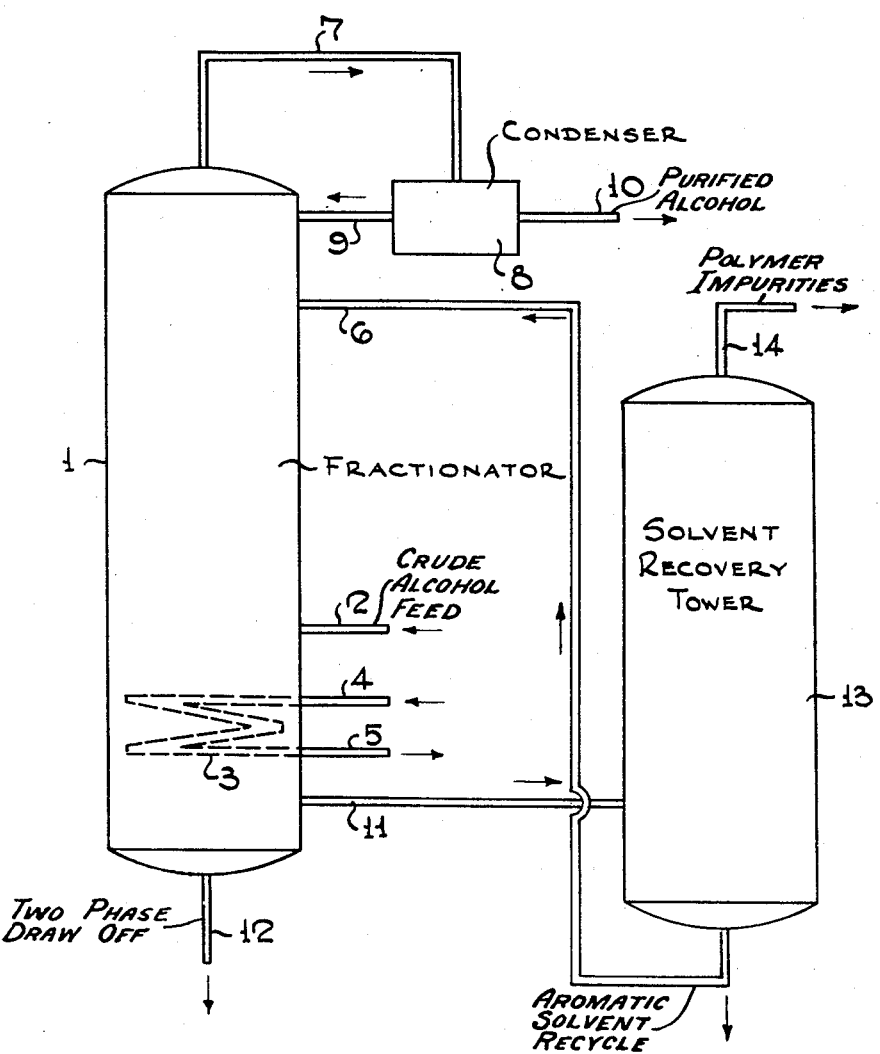

2,575,284

UNITED STATES PATENT OFFICE 2,575,284

EXTRACTIVE DISTILLATION OF POLYMER-CONTAINING ALCOHOLS

Charles E. Morrell, Westfield, and Richard F. Robey, Cranford, N. J., and Nat C. Robertson, Corpus Christi, Tex., assignors to Standard Oil Development Company, a corporation of Delaware Application July 23, 1947, Serial No. 762,992

5 Claims. (Cl. 202—39.5)

This invention relates to a process of purifying alcohols and relates more particularly to the removal of materials which have a higher boiling point than the alcohol.

It is known that alcohols prepared by sulfuric acid hydration of olefins, for example, isopropyl alcohol, even after careful distillation, contains materials which impart a bad odor to the alcohol. Some of these materials are hydrocarbon polymers which have a wide range of boiling points in the alcohol-free state but which boil quite close to the alcohol, mostly azeotropes, when admixed with the latter. Some of these materials contain small amounts of oxygen. In the case of primary, secondary and tertiary alcohols produced from olefinic substances, there are present, besides olefins, ethers and high alcohols as well as sulfur compounds of unknown structure. Alcohols produced by other processes, such as by the reaction of carbon monoxide with hydrogen, likewise contain high boiling impurities. In Patent No. 1,712,475 issued May 7, 1929 to H. E. Buc, a process of purifying alcohols is described in which the alcohol is diluted with water, agitated a number of times with different portions of a highly refined petroleum oil, the oil separated after each agitation and finally the separated alcohol distilled. In Patent No. 2,107,265 issued February 8, 1938 to F. M. Archibald oily impurities are removed from alcohols by passing the alcohol vapors countercurrent to a descending stream of a highly refined oil.

This invention relates to improvements in the processes of purifying alcohols disclosed in the above patents. In the Buc process the alcohols are diluted before being treated with the refined oil. No dilution is required in the process of the present invention. In the Archibald process, the highly refined oil used is not effective in the presence of water, particularly when the alcohol forms an azeotrope with the water, because of the fact that the refined oil is of limited miscibility with aqueous alcohols and purification of the alcohol can be obtained only when a large region of miscibility between the hydrocarbon and the alcohol actually exists.

The present invention consists therefore in subjecting the alcohol to be purified to fractional distillation in a column of practical size including a rectification zone and a stripping zone for countercurrent vapor-liquid contact under refluxing conditions. A sufficiently large quantity of an aromatic solvent is introduced at an upper end of a rectification zone for effectively modifying the relative volatilities of the alcohol with reference to the impurities. The fractionation can be maintained under steady state conditions to obtain alcohol free from impurities overhead while supplying the large quantity of solvent feed to the upper part of the fractionation zone. The temperature of the solvent feed is preferably close to the temperature of the liquid on the solvent feed plate, altho it may be lowered to partially condense vapors ascending to the solvent feed plate.

The alcohol is preferably introduced into a fractionating column between an upper rectification section and a lower stripping section at a point where the ratio of the impurities in the feed is similar to the ratio of these compounds in the internal reflux descending through the column.

The feed stream is preferably preheated to a temperature close to that of the internal liquid reflux under equilibrium boiling conditions at the point of introduction. The preheated feed stream may be liquid, partially vaporized or completely vaporized when introduced into the fractionating column.

The quantity of aromatic compound required to be introduced continuously at the upper part of the rectification zone for accomplishing the desired purification is considerably greater than the quantity of condensate with which it becomes homogeneously mixed in order to make the aromatic compound concentration of the internal reflux substantially above a critical minimum in the range of 80–90 volume percent. With adequate solvent concentration in the internal reflux for effecting the separation, the impurity to be isolated in the bottoms is dissolved in the internal reflux that reaches the bottom of the tower. The minimum solvent concentration of the internal reflux for obtaining the purification should be more than 90 volume percent solvent, preferably 90–95 volume percent.

Under steady stated conditions in a fractional distillation zone the internal reflux having adequate solvent concentrations for accomplishing the purification tends to have a nearly constant solvent concentration in a homogeneous liquid phase on each plate above the feed point and on each plate below the feed point. Although the concentration may be somewhat different in the sections above and below the feed plate. The high solvent concentration is approximately uniform in the internal reflux throughout the fractionation zone. This internal reflux in flowing from the top to the bottom becomes richer in the impurity while the alcohol is distilled overhead.

The accompanying drawing illustrates an apparatus that is appropriate for the practice of this process, although the success is not dependent on using this exact apparatus. The process may be carried out in a batch or continuous manner; however, it is preferred to carry it out as a continuous process.

Referring, therefore, to the drawing, crude alcohol to be purified is fed into the lower part of column 1 by means of pipe 2. Column 1 is a fractionating zone provided with the conventional type of rectifying devices such as bubble plates or packing material. A steam coil 3 with inlet 4 and outlet 5 is provided in the lower portion of the fractionating column 1. A sufficient amount of an aromatic compound, such as diphenyl ether, is introduced into the upper part of column 1 by line 6 so that it is present to the extent of 90 volume percent on each plate.

As the vapors of the alcohol pass up the column they are dissolved in the large excess of aromatic compound descending the column and are collected together with the aromatic compound in pools on each plate. Conditions are maintained on each plate of the tower such that the mixture of alcohol and impurities is at its boiling point and is being continuously contacted with vapors boiled from the plates below. By maintaining the amount of aromatic compound on each plate so large that infinite dilution is approached, the optimum relative volatilities for the separation of the alcohol from the impurities is secured. Furthermore, by controlling the amount of reflux and consequently the reflux ratio, the actual degrees of separation may be varied until the desired product purity and recovery are obtained. Vapors are withdrawn from the upper end of the column through line 7 and condensed in cooler 8 from which a portion is returned through line 9 as reflux. Purified alcohol is withdrawn as product through line 10. Liquid accumulating in the bottom of the column comprising the aromatic compound containing the impurities is withdrawn through line 11. In some cases, especially those in which the feed alcohol contains water greatly in excess of the azeotrope composition, the mixture at the bottom of the column is two-phase in nature, the bottom phase being aqueous. In this case a second draw-off line 12 is provided. The aromatic compound containing the impurities is passed to tower 13 where the aromatic compound is separated from the impurities by distillation, the impurities being removed overhead through line 14, and the aromatic compound being recycled to tower 1 through line 6.

In the operation of the process the portion of the column between the addition of the aromatic compound and the top of the column acts to accomplish rectification between the purified alcohol and the aromatic compound. By supplying a sufficient number of plates above the point at which the aromatic compound is introduced, essentially no carry over of the aromatic compound occurs. The portion of the column between the point at which the aromatic compound and the alcohol to be purified are introduced acts to accomplish rectification between the alcohol to be purified and the impurities contained therein. It is desirable that the liquid phase in this portion of the tower be homogeneous. The ratio of aromatic material to alcohol which can exist as a homogeneous mixture in this section is determined by the miscibility of the alcohol and the aromatic compound and also by the water content of the feed. In case the alcohol to be purified contains more water than corresponds to the azeotrope, the bottom part of this section of the tower may serve to fractionate the alcohol azeotrope from the excess water. The remaining section of the column serves as a stripping zone where the alcohol is stripped from the aromatic compound. In this section at least a portion of the material may be two-phase in nature. The extent to which the two phases will occur will depend to some extent upon the amount of water in the alcohol. If this water is greatly in excess of azeotropic composition then the stripping section may be entirely filled with two liquid phases.

The aromatic compounds used in this invention must consist predominantly of carbon and hydrogen and they must exhibit miscibilities of at least 40%, preferably 75-95% with the water-alcohol azeotropes at the boiling points of the azeotropes. They must have sufficiently high initial boiling point so that they can be readily separated from the water-alcohol azeotrope. In general, this will mean that the initial boiling point must be at least 450° F. There is no requirement as regards the final boiling point but it is preferable that it not be in excess of 800°-900° F. Suitable aromatic compounds include diphenyl, diphenyl ether, dimethyl naphthalenes, alpha methyl naphthalene and diphenylene oxide.

The following example illustrates the advantages obtained according to this invention:

A sample of isopropyl alcohol containing 0.014% of high boiling polymers characterized by an inferior odor was distilled through a plate column countercurrent to diphenyl ether. The alcohol vapors emerging from the plate passed upward through a packed column in which entrained ether was removed. A reflux ratio of 4:1 was maintained, and the ratio of diphenyl ether to alcohol taken overhead was 4:1. The alcohol product was redistilled through a short column to remove the last traces of the ether and impurities contained therein. The final product alcohol contained only 0.006% of the polymers and had an odor comparable to the best commercial isopropyl alcohol.

The process of the present invention is applicable to the purification of alcohols from any source. It is particularly suitable for the purification of alcohols obtained by the hydrolysis of olefin sulfates but may be used equally well in the purification of alcohols prepared by the reaction of carbon oxides with hydrogen and carbon monoxide with olefins.

The nature and objects of the present invention having been thus fully set forth and specific examples of the same given, what is claimed as new and useful and desired to be secured by Letters Patent is:

1. The method of purifying an alcohol containing hydrocarbon polymer impurities difficult to separate by ordinary fractional distillation, which comprises introducing the impure alcohol into a fractional distillation zone, introducing sufficient amounts of an aromatic compound selected from the class consisting of diphenyl, diphenyl ether, dimethyl naphthalenes, alpha methyl naphthalene, and diphenylene oxide, into the fractional distillation zone at a point substantially above the impure alcohol feed point to maintain an internal liquid reflux having an aromatic compound content of 80 to 95 volume per cent, distilling the alcohol whereby the alcohol vapors pass countercurrent to the descending internal liquid reflux, and removing overhead from the distillation zone alcohol free of impurities.

2. Process according to claim 1 in which the concentration of aromatic compound maintained in the internal reflux is of the order of 90–95 volume percent.

3. Process according to claim 1 in which the aromatic compound is diphenyl ether and the concentration of the diphenyl ether in the internal reflux is 90 volume percent.

4. The method of purifying an alcohol containing hydrocarbon polymer impurities difficult to separate by ordinary fractional distillation, which comprises introducing the impure alcohol into a fractional distillation zone, introducing sufficient amounts of an aromatic compound selected from the class consisting of diphenyl, diphenyl ether, dimethyl naphthalenes, alpha methyl naphthalene, and diphenylene oxide, into the fractional distillation zone at a point substantially above the impure alcohol feed point to maintain an internal liquid reflux having an aromatic compound content of 80 to 95 volume per cent, distilling the alcohol whereby the alcohol vapors pass countercurrent to the descending internal liquid reflux, removing alcohol overhead from the distillation zone, and removing the impurities dissolved in the aromatic compound from the bottom of the distillation zone.

5. The method of purifying an impure isopropyl alcohol containing hydrocarbon polymer impurities difficult to separate by ordinary fractional distillation, which comprises introducing the impure alcohol into a fractional distillation zone, introducing sufficient amounts of diphenyl ether into the fractional distillation zone at a point substantially above the impure alcohol feed point to maintain an internal liquid reflux having a minimum content of 80 to 95 volume per cent of the diphenyl ether with the alcohol dissolved therein, distilling the alcohol in said zone whereby the alcohol vapors pass countercurrently to the internal liquid reflux descending in said zone, and removing the alcohol freed of the impurities as a distillation product from the top part of said fractional distillation zone.

CHARLES E. MORRELL.
RICHARD F. ROBEY.
NAT C. ROBERTSON.

REFERENCES CITED

The following references are of record in the file of this patent:

UNITED STATES PATENTS

| Number | Name | Date |
|---|---|---|
| 2,486,342 | Taylor | Oct. 25, 1949 |